United States Patent
Adibhatla et al.

(10) Patent No.: US 6,502,085 B1
(45) Date of Patent: Dec. 31, 2002

(54) METHODS AND SYSTEMS FOR ESTIMATING ENGINE FAULTS

(75) Inventors: Sridhar Adibhatla, West Chester, OH (US); Matthew W. Wiseman, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/466,153

(22) Filed: Dec. 18, 1999

(51) Int. Cl.[7] ............................................... G06N 5/02
(52) U.S. Cl. ........................................ 706/52; 706/20
(58) Field of Search ................... 706/52, 20; 73/116; 701/110; 702/144

(56) References Cited

U.S. PATENT DOCUMENTS

| 4,215,412 | A | | 7/1980 | Bernier et al. | |
|---|---|---|---|---|---|
| 5,080,496 | A | | 1/1992 | Keim et al. | |
| 5,402,521 | A | * | 3/1995 | Niida et al. | 706/20 |
| 5,489,829 | A | | 2/1996 | Umida | |
| 5,689,066 | A | | 11/1997 | Stevenson | |
| 5,726,891 | A | | 3/1998 | Sisson et al. | |
| 5,747,679 | A | * | 5/1998 | Dietz et al. | 73/116 |
| 5,751,609 | A | * | 5/1998 | Schaefer, Jr. et al. | 702/144 |
| 5,971,319 | A | * | 10/1999 | Lichtenberg et al. | 244/1 R |
| 6,285,947 | B1 | * | 9/2001 | Divljakovic et al. | 701/110 |

FOREIGN PATENT DOCUMENTS

EP  0 858 017 A2  8/1998

* cited by examiner

Primary Examiner—Wilbert L. Starks, Jr.
(74) Attorney, Agent, or Firm—Nathan B. Herkamp; Armstrong Teasdale LLP

(57) ABSTRACT

Systems and methods for estimating engine faults are described. In one embodiment, the method includes the steps of obtaining measured engine quantities at a first operating condition, obtaining measured engine quantities at a second operating condition, and generating an estimated fault vector y based on the measured engine quantities obtained at the first and second operating conditions. Model-based values can also be obtained at the first and second operating conditions and used in connection with generating vector y.

18 Claims, 2 Drawing Sheets

METHODS AND SYSTEMS FOR ESTIMATING ENGINE FAULTS

BACKGROUND OF THE INVENTION

The present invention relates generally to gas turbine engines, and more specifically, to estimating faults in such engines.

Gas turbine engines are used in aeronautical, marine, and industrial applications. Gradual wear resulting from repetitive cycles over the life of an engine, as well as assembly errors and incidental damage to hardware components, can cause faults in such engines. Hardware component damage may occur, for example, due to foreign object damage and extreme operating conditions. Engine efficiency and life are improved by detecting faults as quickly as possible and then performing needed repairs. Quickly detecting faults and performing needed repairs also facilitates avoiding cascading damage.

In aeronautical applications, gas path or performance related faults are typically detected using flight-to-flight trending of a few key parameters such as exhaust gas temperature. Changes in sensed parameters are identified between a current flight and a previous flight. If multiple parameters are trended, then the pattern in the changes may be sufficiently distinct to allow classification (i.e., diagnosis) as a specific fault. With flight-to-flight trending, data scatter may occur, and such data scatter may be of a same order of magnitude as the fault effects to be identified. Also, while sudden changes in a trended parameter indicate possible faults, such trending does not necessarily assist in identifying, or isolating, the fault.

BRIEF SUMMARY OF THE INVENTION

Methods and systems for estimating engine faults are described. In one embodiment, the method includes the steps of obtaining measured engine quantities at a first operating condition, obtaining measured engine quantities at a second operating condition, and generating an estimated fault vector y based on the measured engine quantities obtained at the first and second operating conditions. Model-based values can also be obtained at the first and second operating conditions and used in connection with generating vector y.

The first and second operating conditions, in an exemplary embodiment, are similar. For example, and with a gas turbine engine used in an aeronautical application, the operating conditions are two cruise points in a single flight. Alternatively, the operating conditions are takeoff points in two separate flights. In another exemplary embodiment, the operating conditions are different. For example, the first operating condition is a takeoff point and the second operating condition is a cruise point.

The estimated fault vector y is generated in accordance with:

$$y = xR$$

where, x is a vector of size n where n is a number of sensors and model values, and R is a regressor matrix. The regressor matrix R is generated by simulating engines with no faults with random variations in engine quality, deterioration, sensor bias levels, and operating condition to obtain a first set of sensor readings, and simulating engines with several faults of random magnitude within pre-defined magnitude limits with random variations in engine quality, deterioration, sensor bias levels, and operating condition to obtain a second set of sensor readings.

The fault estimation systems and methods provide the advantage that by using inputs acquired during a single or two consecutive flights or cycles, a fault can be detected during the cycle in which it occurs, or a few cycles later.

DETAILED DESCRIPTION OF THE INVENTION

Figure 1:
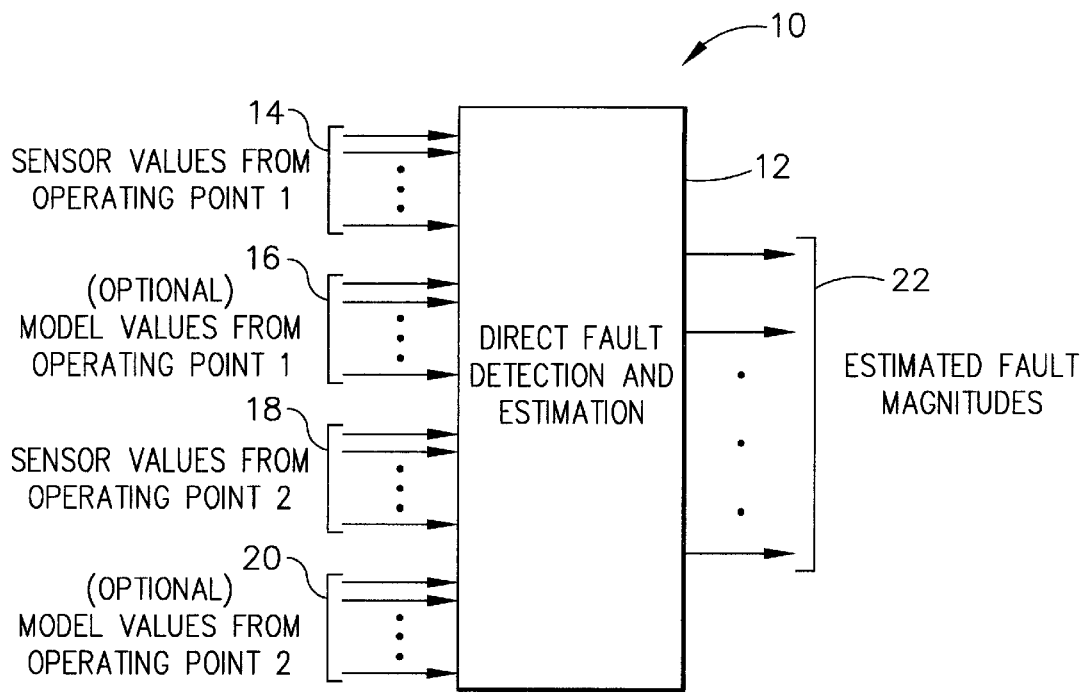
FIG. 1 is a block diagram illustrating a direct fault detection and estimation system.

An exemplary embodiment of a system 10 for performing direct fault detection and estimation is illustrated in FIG. 1. In one embodiment, system 10 is implemented in, and forms part of, an on-board engine control computer including a processor 12. The processor is programmed to execute each step as described herein for fault detection and estimation. The engine control computer also includes a non-volatile memory (NVM). Rather than being integrated into an on-board engine control computer, system 10 could be separate from the control computer yet still on-board an aircraft, or system 10 could be part of a ground-based diagnosis system.

Processor 12 is programmed to sample measured engine quantities 14 such as rotor speeds, temperatures, and pressures from a single operating condition. Optionally, model computed parameters 16 derived from calculations using the measured engine quantities also may be sampled by processor 12. An exemplary embodiment of a model for computing parameters 16 is described below in detail. Processor 12 also is programmed to sample measured engine quantities 18 and, optionally, model computed parameters 20, at a second operating condition.

The first and second operating conditions, in an exemplary embodiment, are similar. For example, and with a gas turbine engine used in an aeronautical application, the operating conditions are two points in a single flight. Alternatively, the first operating condition is in a first flight and the second operating condition is in a subsequent flight. In another exemplary embodiment, the operating conditions are different. For example, the first operating condition is a takeoff point and the second operating condition is a cruise point. Other examples of operating conditions are an idle point, a climb point, and a descent point.

It is assumed that the engine is not faulted at the first operating point, and that measured quantities 14 and computed quantities 16 represent the engine prior to a fault. Measured quantities 18 and computed quantities 20 are sampled later in time. A fault may, or may not, have occurred in the time period between the first operating condition and the second operating condition.

As described below in detail, measured quantities 14 and 18 (and, optionally, computed values 16 and 20) are used to generate estimated fault magnitudes 22. As explained below, the estimates indicate the type and severity of faults that may have occurred in the engine after the occurrence of the first operating condition and before the occurrence of the second operating condition. Processor 12 outputs a separate value for each type of fault under consideration, and the magnitude of a given value indicates the severity of the corresponding fault.

Figure 2:
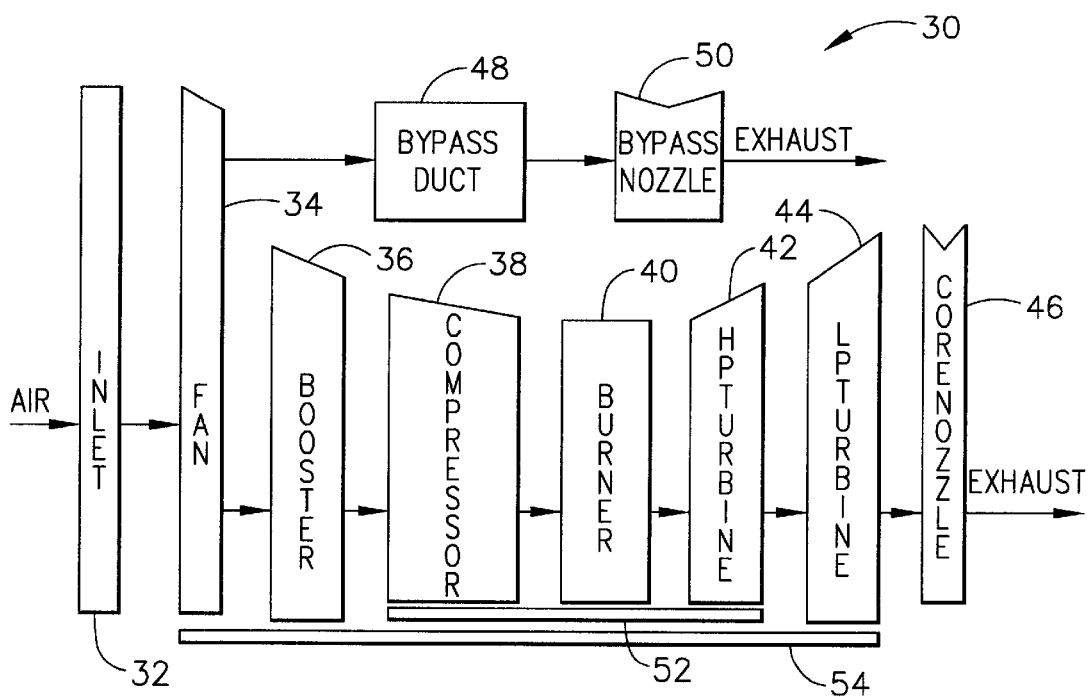
FIG. 2 is a block diagram of an engine model.

FIG. 2 is a block diagram of an engine model 30 for computing values 16 and 20. Model 30 of the plant, or engine, is used to estimate sensed parameters such as rotor speeds, temperatures, and pressures, and additional parameters such as thrust and stall margins, given environmental conditions, power setting parameters, and actuator positions as input. Model 30 is, for example, a physics-based model, a regression fit, or a neural-net model of the engine, all of which are known in the art. In an exemplary embodiment, model 30 is a physics-based aerothermodynamic model of the engine. This type model is referred to as a Component Level Model (CLM) because each major component in the engine (e.g., fan, compressor, combustor, turbines, ducts, and nozzle) is individually modeled, and then the components are assembled into the CLM.

As shown in FIG. 2, an exemplary embodiment of model 30 includes an air inlet 32 and a fan 34 downstream from inlet 32. Model 30 also includes, in series flow relationship, a booster 36, a compressor 38, a burner 40, a high pressure turbine 42, and a low pressure turbine 44. Exhaust flows from a core nozzle 46, which is downstream from low pressure turbine 44. Air also is supplied from fan 34 to a bypass duct 48 and to a bypass nozzle 50. Exhaust flows from bypass nozzle 50. Compressor 38, and high pressure turbine 42 are coupled via a first shaft 52. Fan 34, booster 36, and low pressure turbine 44 are coupled via a second shaft 54. Of course, different model components would be used to model engines having different configurations.

The CLM is a fast running transient engine cycle representation, with realistic sensitivities to flight conditions, control variable inputs and high-pressure compressor bleed. The CLM is tuned to match actual engine test data both for steady-state and transient operation.

Figure 3:
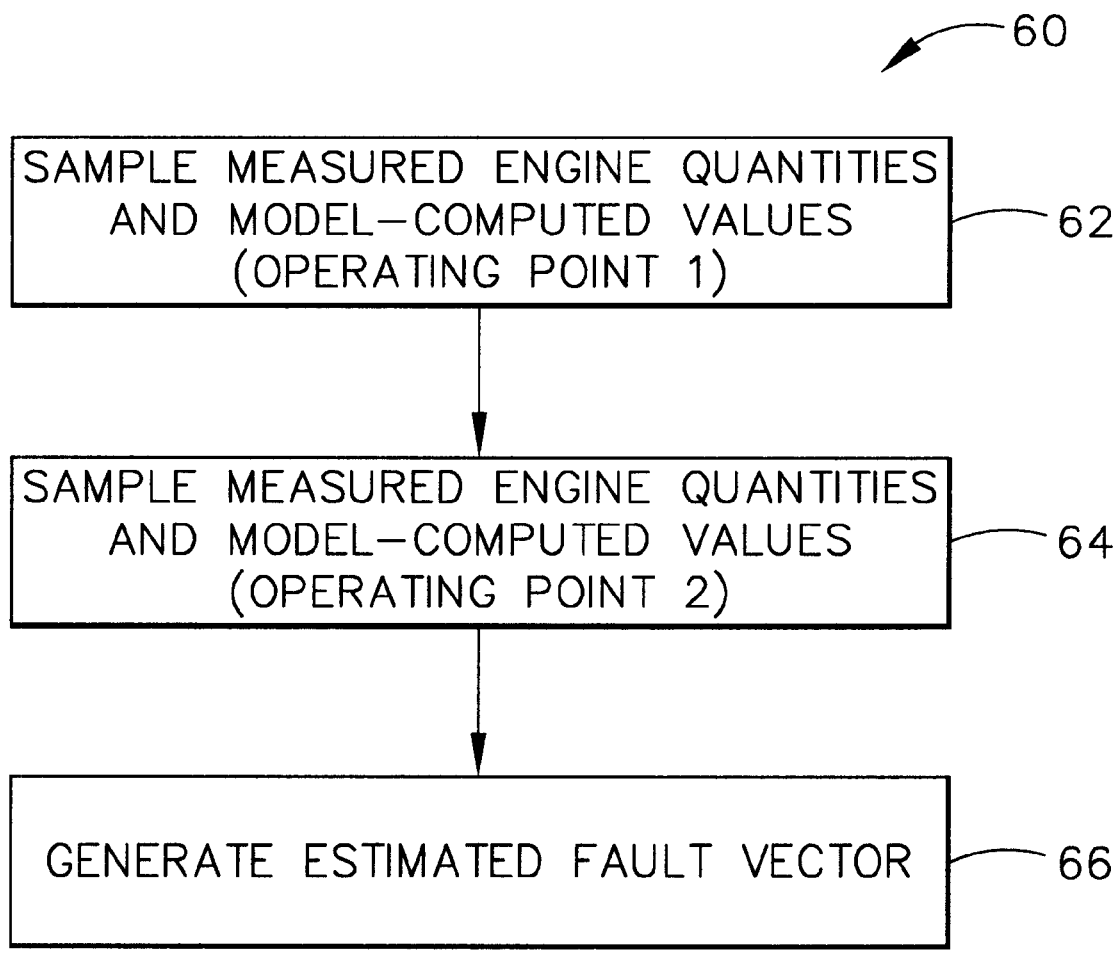
FIG. 3 is a flow chart of the detection and estimation algorithm represented in block diagram form in FIG. 1.

FIG. 3 is a flow chart 60 illustrating process steps executed by processor 12 in generating estimated fault magnitudes. Prior to installation, a large number of engines with random variations in engine quality, deterioration, sensor bias levels, and operating conditions such as altitude, mach number, day temperature, and bleed level are simulated. For each simulated engine, a set of sensor readings and optional model values is obtained. Next, the simulation is repeated for several faults of random magnitude within pre-defined magnitude limits. For each fault simulated, the same set (of course, with different values) of sensor readings and model values is again obtained. Data from faulted and unfaulted simulated engines are used to design processor 12, using techniques such as neural networks or linear regression.

In one specific exemplary embodiment, processor 12 is a linear regressor matrix. Denoting the number of sensors and model values as n, the number of faults by r, and the number of engines simulated for each specific type of fault as well as for the unfaulted case by m, then the regressor matrix R is:

$$R = X \backslash Y$$

where,

X is an m by 2 n matrix of outputs (sensor reading and model values), obtained by concatenating each faulted engine outputs with the same engine unfaulted outputs, Y is the m by r matrix of fault magnitudes, and backslash operator "\" represents a least-squares solution, with X\Y being mathematically equivalent to the psueso-inverse of X times Y.

Alternatively, Y is an m by (r+1) matrix that includes the r faults, with the unfaulted case being appended as a special fault type with a constant magnitude level.

Referring now specifically to FIG. 3, and in operation, processor 12 samples 62 measured engine quantities 14 and model values 16 at a first pre-selected operating point. At a later point in time, processor 12 samples 64 measured engine quantities 18 and model values 20, at a second pre-selected operating point. Using the measured and computed values, processor 12 then generates 66 an estimated fault vector y.

More specifically, and to generate vector y, given two (consecutive) sets of sensor readings and model values x, then:

$$y = xR$$

where, x is a vector of size 2 n, and y is a vector of size r or r+1.

Processor 12 generates estimates, y of the type and severity of faults that may have occurred in the engine after inputs 14 and 16 are obtained and before inputs 18 and 20 are obtained. Processor 12 generates a separate value for each type of fault under consideration, and the magnitude of a given value indicates the severity of the corresponding fault.

The above described fault estimation systems and methods provide the advantage that by using inputs acquired during a single flight or two separate flights or cycles, a fault can be detected during the cycle in which it occurs, or a few cycles later. In addition, while the above described fault estimation systems and methods have been described in terms of a single operating condition, such as a first or second operating condition, it is to be understood that an operating condition as described can include a set of operating conditions or operating points. For example, a first set of operating conditions may comprise a ground idle and a takeoff point, and a second set of operating conditions may comprise a cruise point and a descent point later in the same flight.

While the invention has been described in terms of various specific embodiments, those skilled in the art will recognize that the invention can be practiced with modification within the spirit and scope of the claims.

What is claimed is:

1. A method for estimating engine faults, said method comprising the steps of:

obtaining measured engine quantities at a first operating condition;

obtaining measured engine quantities at a second operating condition, wherein the measured engine quantities comprise at least one of rotor speed, temperature, and pressure;

generating an estimated fault vector y based on the measured engine quantities obtained at the first and second operating conditions.

2. A method in accordance with claim 1 wherein the first operating condition and second operating condition each comprise at least one of an idle point, a takeoff point, a climb point, a cruise point, and a descent point.

3. A method in accordance with claim 1 wherein the first operating condition occurs during a first flight and the second operating condition occurs during a subsequent flight.

4. A method in accordance with claim 1 wherein the first operating condition and second operating condition occur during the same flight.

5. A method in accordance with claim 1 further comprising the step of obtaining model-computed parameters at one or both of the first operating condition and the second operating condition.

6. A method in accordance with claim 1 wherein estimated fault vector y is generated in accordance with:

$$y = xR$$

where, x is a vector of sensor and model values, and

R is a regressor matrix.

7. A method in accordance with claim 6 wherein regressor matrix R is generated by simulating engines with no faults with random variations in engine quality, deterioration, sensor bias levels, and operating condition to obtain a first set of sensor readings, and simulating engines with several faults of random magnitude within pre-defined magnitude limits with random variations in engine quality, deterioration, sensor bias levels, and operating condition to obtain a second set of sensor readings.

8. A method in accordance with claim 1 wherein estimated fault vector y is an output of a neural network, and sensor and model values are inputs to the neural network.

9. A method in accordance with claim 8 wherein the neural network is trained by simulating engines with no faults with random variations in engine quality, deterioration, sensor bias levels, and operating condition to obtain a first set of sensor readings, and simulating engines with several faults of random magnitude within pre-defined magnitude limits with random variations in engine quality, deterioration, sensor bias levels, and operating condition to obtain a second set of sensor readings.

10. A processor programmed for estimating engine faults, said processor programmed to:

sample measured engine quantities at a first operating condition;

sample measured engine quantities at a second operating condition, wherein the sampled engine quantities comprise at least one of rotor speed, temperature, and pressure; and generate an estimated fault vector y based on the measured engine quantities obtained at the first and second operating conditions.

11. A processor in accordance with claim 10 wherein the first operating condition and second operating condition each comprise at least one of an idle point, a takeoff point, a climb point, a cruise point, and a descent point.

12. A processor in accordance with claim 10 wherein the first operating condition occurs during a first flight and the second operating condition occurs during a subsequent flight.

13. A processor in accordance with claim 10 wherein both the first operating condition and the second operating condition occurs during a same flight.

14. A processor in accordance with claim 10 wherein said processor is further programmed to sample model-computed parameters at the first operating condition.

15. A processor in accordance with claim 10 wherein said processor is further programmed to obtain model-computed parameters at the second operating condition.

16. A processor in accordance with claim 10 wherein to estimate fault vector y, said processor is programmed to determine:

$$y = xR$$

where, x is a vector of sensors and model values, and

R is a regressor matrix.

17. A processor in accordance with claim 16 wherein regressor matrix R is generated by simulating engines with no faults with random variations in engine quality, deterioration, sensor bias levels, and operating condition to obtain a first set of sensor readings, and simulating engines with several faults of random magnitude within pre-defined magnitude limits with random variations in engine quality, deterioration, sensor bias levels, and operating conditions to obtain a second set of sensor readings.

18. A processor programmed for estimating engine faults, said processor programmed to:

sample measured engine quantities at a first operating condition;

sample measured engine quantities at a second operating condition; and generate an estimated fault vector y by implementing a neural network comprising inputs of sensor and model values and outputs of fault magnitudes.

* * * * *